V. G. McBRAYER.
BOW REST.
APPLICATION FILED JUNE 4, 1914.

1,220,522.

Patented Mar. 27, 1917.

Witnesses
Edw. S. Hall.

Inventor
Vernon G. McBrayer.
By Richard B. Owen.
Attorney

UNITED STATES PATENT OFFICE.

VERNON G. McBRAYER, OF QUENEMO, KANSAS.

BOW-REST.

1,220,522.  Specification of Letters Patent.  Patented Mar. 27, 1917.

Application filed June 4, 1914. Serial No. 843,073.

*To all whom it may concern:*

Be it known that I, VERNON G. MCBRAYER, a citizen of the United States, residing at Quenemo, in the county of Osage and State of Kansas, have invented certain new and useful Improvements in Bow-Rests, of which the following is a specification.

This invention relates to supports for folding vehicle tops, and more particularly to that class of supports which is adapted to receive and support the bow of a vehicle top when the top is in closed position.

The object of my invention resides in the provision of a cheap and effective support of the above class which will receive the bow of a vehicle top when the same is in closed position, and take up the jar and shock incident to the traveling of the vehicle.

Another object of my invention resides in the provision of a means by which the support may be detachably mounted in operative position on the side of the vehicle.

A still further object of my invention resides in the provision of a means whereby the cushioning element may be adjusted to any desired tension.

Other objects will become apparent when a more thorough understanding of my invention is attained.

In the drawings:—

Similar reference characters indicate similar parts throughout the several views of the drawings.

Referring more particularly to the drawings, in which the preferred embodiment of my invention is shown, I provide a support-engaging element, which in the present instance comprises a substantially cylindrical body portion 1, said body portion 1 being provided with a central bore 2, and a bushing 3 is mounted for rotation therein.

Figure 1:
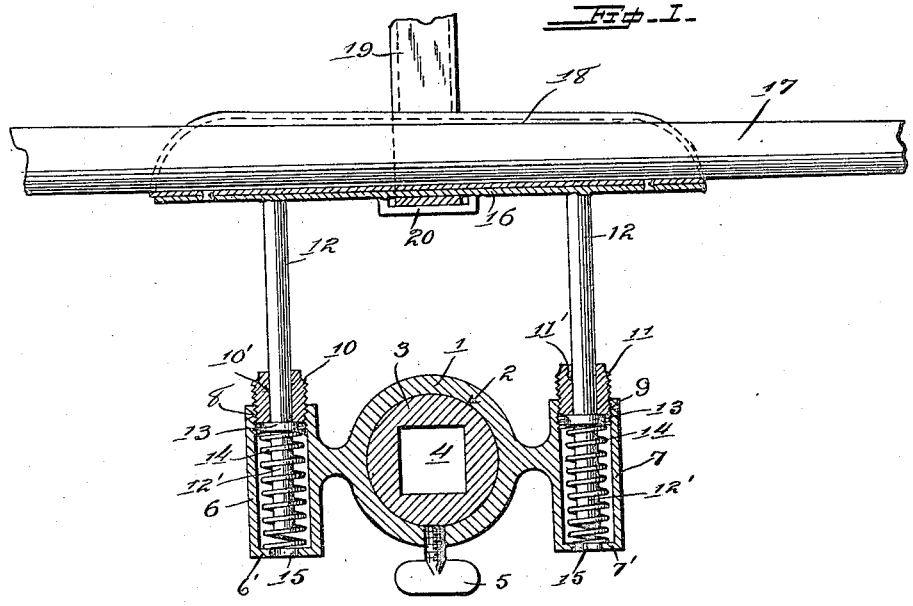
Figure 1 is a vertical sectional view of a support embodying the preferred form of my invention.
Figure 2:
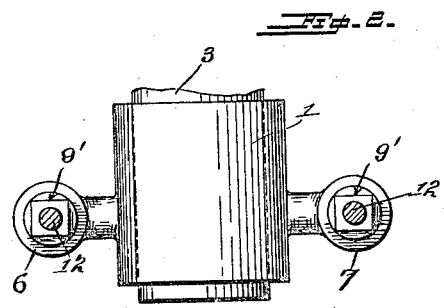
Fig. 2 is a top plan view of the same with the bow-engaging element removed therefrom.

The said bushing 3 is provided with a central bore 4 extending longitudinally of the same. As shown in Fig. 1, the central bore 4 is preferably square in contour, and is adapted to engage with a complemental projection or support extending laterally from the side of a vehicle, the support not being shown in the drawings. A set screw or wing nut 5 is placed in the cylindrical body portion 1, and is adapted to impinge against the surface of the bushing 3, and prevent rotation of the same.

In the preferred form of my cushioning element, I provide tubular members 6 and 7, said tubular members 6 and 7 being supported preferably at diametrically opposite points upon the outer surface of the body portion 1, and formed integrally therewith.

The tubular members 6 and 7 are provided adjacent their upper ends with interior threaded portions 8 and 9 respectively.

Bushings 10 and 11, having exterior screw threads, are adapted to be placed in the open ends of the tubular members 6 and 7 and adapted to be adjusted vertically in the open ends of the said tubular members 6 and 7. The said bushings 10 and 11 are provided with central bores 10' and 11' respectively, said bores being adapted to receive plunger rods 12. The said bushings 10 and 11 are provided with squared heads 9', for the purpose of rotating the bushings 10 and 11 and adjusting the same in the ends of the tubular members 6 and 7. From the above it will be readily seen that the bushings 10 and 11 serve as a means to guide the rods 12, and also serve as a means to close the open end of the tubular members 6 and 7.

The plunger rods 12 are provided adjacent their lower ends, and within the tubular members 6 and 7, with annular flanges 13, said flanges 13 serving as a means for engagement with springs 14, the said springs 14 surrounding the lower ends 12' of the said plunger rods 12 and bearing against the undersides of the annular flanges 13. The tubular members 6 and 7 are provided with closed ends 6' and 7' respectively, said closed ends being adapted to receive the lower end of the springs 14. The said closed ends 6' and 7' are provided with central openings 15, said openings serving to allow the passage of the lower ends 12' of the plunger rods 12 therethrough.

Supported on the upper ends of the said plunger rods 12 and rigidly secured thereto is a bow-receiving element 16, said bow-receiving element being of such a contour as will receive the bow 17 of a vehicle top when in folded position, and prevent accidental displacement therefrom. A covering 18 of leather or other suitable material is provided on the bow-receiving element 16 so as to prevent the scratching or marring of the bow 17 when the same is received therein. The shape of the bow-receiving element 16 is such as will prevent accidental displacement of the bow 17 under ordinary road travel, but to insure the securement of the bow 17 in the said bow-receiving element 16, I provide a strap 19, which is adapted to engage over the folded top of the vehicle and prevent displacement of the bow 17 when a severe jolt or shock is delivered by the wheels of the vehicle passing over obstacles in the road. To prevent the movement of the strap 19 with relation to the bow-receiving element 16 I provide a loop 20, through which the strap 19 is passed, thereby preventing the movement of the same.

The operation of my invention it is thought will be clearly understood from the foregoing description, and from an inspection of the drawings.

In use, there are preferably two of the devices shown secured on opposite sides of a vehicle, the squared opening 4 in the bushing 3 being adapted to engage with a complemental supporting element secured to the side of the vehicle, not shown in the drawings.

When it is desired to fold the top, the bow portion thereof, indicated at 17 in the drawings, is lowered on to the bow-receiving element 16. If the bow-receiving element 16 is not at a proper height to receive the bow 17, bushings 10 and 11 are slightly withdrawn from the tubular members 6 and 7, thereby allowing the springs 14 to force the plunger rods 12 upwardly, carrying the bow-receiving element 16 therewith. If a sudden jar or shock is delivered to the supporting element, which is secured to the vehicle, the cylindrical body portion 1 will be carried therewith, and the tubular members 6 and 7 will move in a vertical plane, the springs 14 taking up the sudden movement upward of the tubular members 6 and 7, thereby preventing the shock which would otherwise be delivered directly to the bow 17, thereby prolonging the life and the use of the bow. To adjust the tension of the springs 14, the bushings 10 and 11 are rotated by the squared portions 9', either up or down, thereby adjusting the tension of the springs. Forcing the bushings 10 and 11 downward will increase the tension of the springs, and will at the same time lower the bow-receiving element 16, thereby performing a two fold function. These bushings in reality perform a three fold function. In addition to adjusting the tension of the spring and limiting the upward movement of the plunger rods 12, they also form guides upon the rods 12 and prevent the wabbling of the same during operation.

While I have shown a particular form of my invention, it will be readily understood that certain minor changes in the details thereof may be made without departing from the spirit of the invention.

What I claim and desire to secure by Letters Patent is:—

1. A bow rest, including a cylindrical body portion, tubular spring containing chambers secured to the cylindrical body portion, plungers supported by said spring and movable in said tubular members, means movably mounted in said tubular chambers for guiding and adjusting said plungers, and a bow receiving element supported by said plungers.

2. In a bow rest, a body, chamber portions carried by the body and being open at one end, the said open end being interiorly threaded, a bushing provided with a central bore threaded in each of said open ends, a plunger slidably mounted in each chamber and projecting through said bushings, a shoulder on each plunger, springs in each chamber for yieldably maintaining said shoulders engaged with said bushings, and a bow supporting member connecting the outer ends of said plungers.

3. In a bow rest, a tubular member open at one end adapted to be arranged upon a vehicle body and being provided with interior threads, a flange projecting inwardly from the opposite end of said member, a bushing having a central bore threaded in said member, a plunger slidably mounted in said tubular member and projecting through said bushing, a shoulder on said plunger adapted to engage with said bushing, an expansion spring interposed between said shoulder and said flange, and means on said plunger for supporting a bow.

In testimony whereof I affix my signature in presence of two witnesses.

VERNON G. McBRAYER.

Witnesses:
 W. G. McBrayer,
 C. S. Shuster.

Copies of this patent may be obtained for five cents each, by addressing the "Commissioner of Patents, Washington, D. C."